(12) United States Patent
Maytal (10) Patent No.: US 9,773,111 B2
(45) Date of Patent: Sep. 26, 2017

(54) SOFTWARE-BASED SIDE-CHANNEL ATTACK PREVENTION

(75) Inventor: Benjamin Maytal, Mevasseret (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 353 days.

(21) Appl. No.: 13/825,272

(22) PCT Filed: Aug. 14, 2012

(86) PCT No.: PCT/US2012/050767
§ 371 (c)(1),
(2), (4) Date: Mar. 20, 2013

(87) PCT Pub. No.: WO2014/028005
PCT Pub. Date: Feb. 20, 2014

(65) Prior Publication Data
US 2015/0134973 A1 May 14, 2015

(51) Int. Cl.
G06F 21/55 (2013.01)
G06F 21/57 (2013.01)
H04L 9/00 (2006.01)

(52) U.S. Cl.
CPC .......... *G06F 21/556* (2013.01); *G06F 21/558* (2013.01); *G06F 21/572* (2013.01); *H04L 9/002* (2013.01); *G06F 2221/033* (2013.01)

(58) Field of Classification Search
CPC ..... H04L 9/0612; H04L 9/00; H04L 63/0853; G06F 21/577
See application file for complete search history.

(56) References Cited

U.S. PATENT DOCUMENTS 4,706,266 A * 11/1987 Qayyum .................. 377/33
6,278,783 B1 8/2001 Kocher et al.
(Continued)

FOREIGN PATENT DOCUMENTS

AT 325478 T 6/2006
AT 385089 T 2/2008
(Continued)

OTHER PUBLICATIONS

Shiting, Lu. Micro-architectural Attacks and Countermeasures. Diss. Department of Microelectronics and Information Technology (IMIT), School of Information and Communication Technology (ICT), Royal Institute of Technology (KTH), Stockholm, Sweden, 2010.*

(Continued)

*Primary Examiner* — Saleh Najjar
*Assistant Examiner* — Simon Kanaan
(74) *Attorney, Agent, or Firm* — Amin, Turocy & Watson, LLP (57) ABSTRACT

Technologies for preventing software-based side-channel attacks are generally disclosed. In some examples, a computing device may receive a cryptographic program having one or more programming instructions for performing a key handling operation and may add one or more programming instructions for performing an anti-attack operation to the one or more programming instructions for performing the key handling operation. The computing device may transmit the resulting cryptographic program with the anti-attack operation to an execution device. The execution device, such as a cloud computing system, may execute the cryptographic program, thereby causing execution of the anti-attack operation. The execution of cryptographic program may prevent a side-channel attack by masking the number of key performance events that occur.

33 Claims, 4 Drawing Sheets

(56) References Cited

U.S. PATENT DOCUMENTS

| | | | |
|---|---|---|---|
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,804,782 B1* | 10/2004 | Qiu et al. | 713/194 |
| 7,318,145 B1* | 1/2008 | Stribaek et al. | 712/220 |
| 7,500,112 B1* | 3/2009 | Wille et al. | 713/194 |
| 7,506,165 B2 | 3/2009 | Kocher et al. | |
| 7,554,865 B2 | 6/2009 | Pickles | |
| 7,565,492 B2* | 7/2009 | Mckeen et al. | 711/129 |
| 7,587,044 B2 | 9/2009 | Kocher et al. | |
| 7,599,488 B2 | 10/2009 | Kocher et al. | |
| 7,634,083 B2 | 12/2009 | Kocher et al. | |
| 7,668,310 B2 | 2/2010 | Kocher et al. | |
| 7,706,538 B1* | 4/2010 | Hughes | H04L 9/00 380/269 |
| 7,787,620 B2 | 8/2010 | Kocher et al. | |
| 7,792,287 B2 | 9/2010 | Kocher et al. | |
| 7,848,515 B2* | 12/2010 | Dupaquis et al. | 380/28 |
| 8,031,540 B2 | 10/2011 | Pickles | |
| 8,898,746 B2* | 11/2014 | Gregg | H04L 63/10 726/29 |
| 2001/0002486 A1 | 5/2001 | Kocher et al. | |
| 2001/0053220 A1 | 12/2001 | Kocher et al. | |
| 2002/0124178 A1 | 9/2002 | Kocher et al. | |
| 2003/0028771 A1 | 2/2003 | Kocher et al. | |
| 2003/0084336 A1* | 5/2003 | Anderson et al. | 713/200 |
| 2003/0233545 A1* | 12/2003 | Eldar | H04L 9/00 713/168 |
| 2004/0105541 A1* | 6/2004 | Elbe et al. | 380/28 |
| 2005/0108534 A1* | 5/2005 | Bajikar | G06F 21/606 713/172 |
| 2006/0045264 A1 | 3/2006 | Kocher et al. | |
| 2007/0194104 A1 | 8/2007 | Fukuda et al. | |
| 2008/0010458 A1* | 1/2008 | Holtzman | H04L 63/0823 713/175 |
| 2008/0022146 A1 | 1/2008 | Kocher et al. | |
| 2008/0059826 A1 | 3/2008 | Kocher et al. | |
| 2008/0104400 A1 | 5/2008 | Kocher et al. | |
| 2008/0123446 A1 | 5/2008 | Pickles | |
| 2009/0010424 A1* | 1/2009 | Qi et al. | 380/28 |
| 2009/0113217 A1 | 4/2009 | Dolgunov et al. | |
| 2009/0257295 A1 | 10/2009 | Pickles | |
| 2010/0091982 A1 | 4/2010 | Kocher et al. | |
| 2010/0180083 A1 | 7/2010 | Lee et al. | |
| 2012/0331309 A1* | 12/2012 | Scott | G06F 21/558 713/194 |
| 2013/0010955 A1* | 1/2013 | Lu | H04L 63/0485 380/255 |
| 2014/0136583 A1* | 5/2014 | Hyde | G06F 7/588 708/250 |

FOREIGN PATENT DOCUMENTS

| | | |
|---|---|---|
| AT | 429748 T | 5/2009 |
| CA | 2333095 C | 5/2005 |
| CA | 2316227 C | 8/2009 |
| DE | 69834431 T2 | 4/2007 |
| DE | 69938045 T2 | 1/2009 |
| EP | 1090480 A2 | 4/2001 |
| EP | 1084543 B1 | 1/2008 |
| EP | 1926241 A2 | 5/2008 |
| EP | 1933496 A2 | 6/2008 |
| EP | 1691501 B1 | 4/2009 |
| EP | 1050133 B2 | 5/2009 |
| EP | 2280502 A2 | 2/2011 |
| IL | 139935 A | 6/2005 |
| JP | 2002519722 A | 7/2002 |
| TW | 200823926 A | 6/2008 |
| WO | 9529441 | 11/1995 |
| WO | WO 99/35782 A1 | 7/1999 |
| WO | WO 99/63696 A1 | 12/1999 |
| WO | WO 99/67919 A2 | 12/1999 |
| WO | WO 99/67919 A3 | 12/1999 |
| WO | WO2008/036589 A2 | 3/2008 |
| WO | WO2008/036589 A3 | 3/2008 |

OTHER PUBLICATIONS

Uhsadel, Leif, Andy Georges, and Ingrid Verbauwhede. "Exploiting hardware performance counters." Fault Diagnosis and Tolerance in Cryptography, 2008. FDTC'08. 5th Workshop on. IEEE, 2008.*

Wen, David, and M. Eng. Defending against side-channel attacks: DynamoREA. Diss. Massachusetts Institute of Technology, 2011.*

Kong, Jingfei, et al. "Hardware-software integrated approaches to defend against software cache-based side channel attacks." High Performance Computer Architecture, 2009. HPCA 2009. IEEE 15th International Symposium on. IEEE, 2009. (System does not permit attachment of "read only" documents. Document may be viewed at http://hdl.handle.net/1721.1/.*

Kong, Jingfei, et al. "Deconstructing new cache designs for thwarting software cache-based side channel attacks." Proceedings of the 2nd ACM workshop on Computer security architectures. ACM, 2008.*

Cleemput et al.; Compiler Mitigations for Time Attacks on Modern x86 Processors; Jan. 2012; Retrieved from the Internet <URL:dl.acm.org/citation.cfm?id=2086702>; pp. 1-20 as printed.*

Jinesh Varia; Migrating your Existing Applications to the AWS Cloud; 2010; Retrieved from the Internet <URL:media.amazonwebservices.com/CloudMigration-main.pdf>; pp. 1-23 as printed.*

Shi et al.; Limiting Cache-based Side-Channel in Multi-tenant Cloud using Dynamic Page Coloring; 2011; Retrieved from the Internet <URL: ieeexplore.ieee.org/xpls/abs_all.jsp?arnumber=5958812&tag=1>; pp. 1-6 as printed.*

Uhsadel et al.; Exploiting Hardware Performance Counters; 2008; Retrieved from the Internet <URL: ieeexplore.ieee.org/xpls/abs_all.jsp?arnumber=4599558>; pp. 1-9 as printed.*

No stated author; MS—Evaluating Memory and Cache Usage; Feb. 2011; Retrieved from the Internet <URL: web.archive.org/web/20110223214647/http://technet.microsoft.com/en-us/library/cc958290.aspx>; pp. 1-3 as printed.*

International Search Report and Written Opinion for PCT/US2012/050767 dated Oct. 24, 2012.

Champagne, Scalable Security Architecture for Trusteed Software, A Dissertation presented to the faculty of Princeton University (Jun. 2010), pp. 1-231.

Hardware Performance Counter, http://en.wikipedia.org/wiki/Hardware_performance_counter (Printed from Internet Dec. 11, 2012).

Intel 64 and IA-32 Architectures Software Developer's Manual, vol. 1: Basic Architecture (May 2011), pp. 1-542.

Tromer et al., Efficient Cache Attacks on AES, and Countermeasures, *J. Cryptol.* (Jul. 23, 2009), pp. 1-35.

* cited by examiner

SOFTWARE-BASED SIDE-CHANNEL ATTACK PREVENTION

CLAIM OF PRIORITY

This application is a U.S. national stage filing under 35 U.S.C. §371 of International Application No. PCT/US2012/50767 filed Aug. 14, 2012 entitled "Software-Based Side-Channel Attack Prevention," the disclosure of which is incorporated by reference in its entirety.

BACKGROUND

Cryptography is one security component for individual computing devices and network systems. The successful implementation of secure and efficient cryptographic protocols has engendered confidence in the general public that commercial computing networks and applications, such as shared computing resources and personal information applications, are safe. This confidence has driven the dramatic growth in both of these industries.

Nonetheless, no security system is infallible. Although conventional cryptographic systems may be effective at thwarting direct attacks designed, for example, to obtain cryptographic keys or unencrypted data, such systems remain vulnerable to certain indirect attacks, such as side-channel attacks. In general, a side-channel attack involves deriving an encryption key based on the observable effects of computation, which may provide information on the attached program execution. Side-channel attacks go beyond the plaintext and encrypted text used during the encryption process and instead focus on information involving timing (e.g., the time required to perform an operation), power consumption, sound, and electromagnetic characteristics.

Typically, side-channel attacks are performed on a computing device at hand, such as a Smart Card. These attacks focus on measuring parameters such as power consumption and/or electromagnetic characteristics of the computing device. In contrast, cloud-based side-channel attacks are enabled by running an attack application simultaneously with the attacked program on a cloud computing device. These attack programs rely on gathering performance event information from performance counters available in the executing CPU. From this information, a side-channel attack may determine an entire encryption key one element at a time. Existing computer and network security architectures are not adequately designed to effectively detect and respond to side-channel attacks, especially without introducing prohibitive costs and inefficiencies into the very systems they are designed to protect.

SUMMARY

In one embodiment, a method for preventing software-based side-channel attacks may include receiving, by a computing device, a cryptographic program having one or more programming instructions for performing a key handling operation, adding, by the computing device, one or more programming instructions for performing an anti-attack operation to the one or more programming instructions for performing the key handling operation, and transmitting, by the computing device, the cryptographic program with the anti-attack operation to an execution device.

In another embodiment, a method for preventing software-based side-channel attacks may include receiving, by a cloud computing device, a cryptographic program having one or more programming instructions for performing a key handling operation that includes an anti-attack operation, and executing, by the cloud computing device, the cryptographic program, thereby causing execution of the anti-attack operation. Executing the cryptographic program may cause a plurality of key performance events to occur. The anti-attack operation will cause performance event statistics measured by performance counters to change significantly in a random manner.

In still another embodiment, a method for preventing software-based side-channel attacks may include receiving, by a computing device including a plurality of performance counters, encrypted information, and executing an algorithm to decrypt the encrypted information. The algorithm may include an anti-attack operation. Executing the algorithm may cause a plurality of key performance events to occur.

In one embodiment, a system for preventing software-based side-channel attacks may include a computing device, and a non-transitory storage medium configured to be in operable communication with the computing device. The storage medium may contain one or more programming instructions that, when executed, cause the computing device to receive a cryptographic program having one or more programming instructions for performing a key handling operation, add one or more programming instructions for performing an anti-attack operation to the one or more programming instructions for performing the key handling operation, and transmit the cryptographic program with the anti-attack operation to an execution device.

In another embodiment, a system for preventing software-based side-channel attacks may include a computing device, and a non-transitory storage medium configured to be in operable communication with the computing device. The storage medium may contain one or more programming instructions that, when executed, cause the computing device to receive a cryptographic program having one or more programming instructions for performing a key handling operation that includes an anti-attack operation, and execute the cryptographic program, thereby causing execution of the anti-attack operation. Executing the cryptographic program may cause a plurality of key performance events to occur.

In still another embodiment, a system for preventing software-based side-channel attacks may include a computing device comprising a plurality of performance counters, and a non-transitory storage medium configured to be in operable communication with the computing device. The storage medium may contain one or more programming instructions that, when executed, cause the computing device to receive encrypted information, and execute an algorithm to decrypt the encrypted information. The algorithm may include an anti-attack operation. Executing the algorithm may cause a plurality of key performance events to occur.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior art. As used in this document, the term "comprising" means "including, but not limited to."

The following terms shall have, for the purposes of this application, the respective meanings set forth below.

An "electronic device" refers to a device that includes a processing device and a tangible, non-transitory computer-readable memory. The memory may contain programming instructions that, when executed by the processing device, cause the device to perform one or more operations according to the programming instructions. Illustrative electronic devices include, but are not limited to, personal computers, gaming systems, televisions, home automation systems and mobile devices.

A "mobile device" refers to an electronic device that is generally portable in size and nature. Accordingly, a user may transport a mobile device with relative ease. Illustrative mobile devices include pagers, cellular phones, feature phones, smartphones, personal digital assistants (PDAs), cameras, tablet computers, phone-tablet hybrid devices, laptop computers, netbooks, ultrabooks, global positioning satellite (GPS) navigation devices, in-dash automotive components, media players, watches and the like.

A "computing device" is an electronic device, such as, for example, a computer, a server or components thereof. The computing device may be maintained by entities such as financial institutions, corporations, governments, and/or the like. The computing device may generally contain a memory or other non-transitory, tangible storage medium for housing programming instructions, data or information regarding one or more applications, data or information regarding one or more user preferences and/or the like. The data may be contained in a database, which is stored in the memory or other storage device. The data may be secured by any method now known or later developed for securing data. The computing device may further be in operable communication with one or more electronic devices. The communication between the computing device and each of the electronic devices may further be secured by any now known or later developed for securing transmissions or other forms of communication.

A "cryptographic program" includes hardware and/or software that are used to perform one or more of an encryption operation and a decryption operation. Illustrative cryptographic programs include hardware and/or software used to perform one or more symmetric-key cryptographic algorithms, including block cipher algorithms, such as the Data Encryption Standard (DES) and the Advanced Encryption Standard (AES), stream-cipher algorithms, such as RC4, and cryptographic hash functions, such as MD4, MD5, SHA-1, SHA-2, and SHA-3, and the like. In addition, illustrative cryptographic programs include hardware and/or software used to perform one or more public-key cryptographic algorithms, such as Diffie-Hellman, RSA, Cramer-Shoup, ELGamal, elliptic curve techniques, and the like. Non-cryptographic operations may be performed as part of a cryptographic program. As such, the encryption operation and/or decryption operation performed in a cryptographic program may constitute all or a portion of the cryptographic program without limitation.

The present disclosure is directed to methods and systems for resisting software-based side-channel attacks. The various embodiments of the methods and systems described herein may be particularly effective at resisting side-channel attacks in a cloud computing environment, where software implementing the side-channel attack may be resident on the same computing device as an operational program. A common side-channel attack in this environment collects performance information from performance counters, where events such as cache miss or taken branch statistics may provide information on a program's behavior. By way of example, an anti-attack operation including one or more programming instructions may be added to an operational program, such as a cryptographic program, that includes a key handling operation. The anti-attack operation may be configured to cause a random number of key performance events when executed. The number of key performance events that are caused may depend upon the number of key performance events that occur in the operational program. For example, if the operational program includes ten (10) memory references, the anti-attack operation may include, for example, and without limitation, about 30 to about 100 memory references, which result in a random number of cache misses. Similarly, the anti-attack operation may produce an equivalent increase in the number of operations that could result in conditional branches and software faults when executed.

Accordingly, each time that a side-channel attack is performed on a device running the program, a different number of key performance events may occur with a variation that is greater than existed in the operational program alone. As such, attempting to perform software-based side channel attacks may result in meaningless information to the attacker, thus thwarting the side-channel attack.

Figure 1:
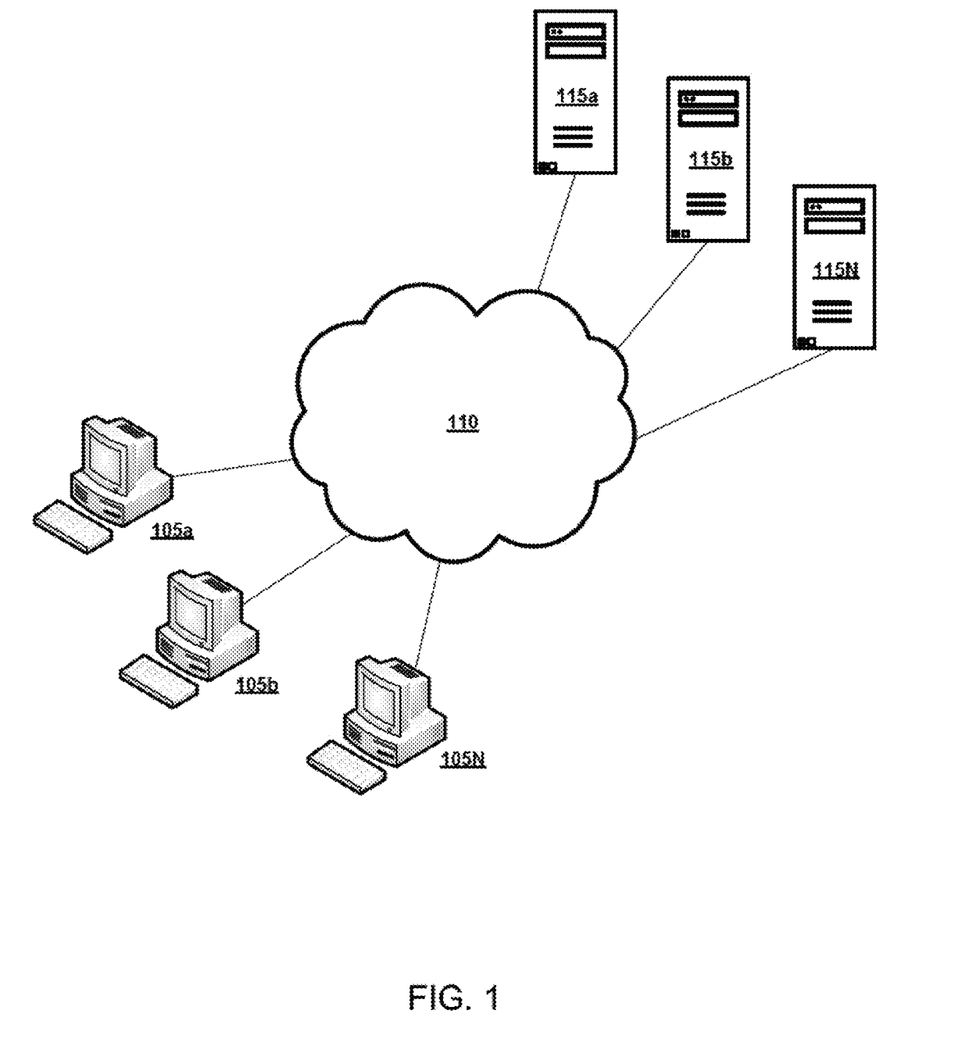
FIG. 1 depicts a block diagram of an illustrative cloud computing system, arranged in accordance with at least some embodiments described herein.

FIG. 1 depicts a block diagram of an illustrative cloud computing system, arranged in accordance with at least some embodiments described herein. As shown in FIG. 1, a cloud computing system may be in communication with one or more remote computing devices, such as 105a-N. In one embodiment, each remote computing device 105a-N may be remotely located from the cloud computing system and may be remotely located from one or more of the other remote computing devices. In an alternate embodiment, at least one remote computing device, such as 105a, may be remotely located from the cloud computing system.

In one embodiment, the remote computing devices 105a-N may be communicatively coupled to the cloud computing system via a computer network 110. The computer network may include one or more of a local area network, a wide area network, an intranet, the Internet, and/or the like.

The cloud computing system may include multiple cloud computing devices 115a-N. In one embodiment, each cloud computing devices 115a-N may be located proximate to at least one other cloud computing device. In one embodiment, all cloud computing devices 115a-N may be located proximate to each other cloud computing device. In one embodiment, at least one cloud computing device, such as 115a, may be remotely located from at least one other cloud computing device, such as 115b.

The cloud computing system may be publicly accessible to users of the remote computing devices desiring computational capacity for performing an algorithm or any other computer-based task. In one embodiment, one or more of the cloud computing devices 115a-N may perform an algorithm received from a remote computing device, such as 105a, for a fee.

Figure 2:
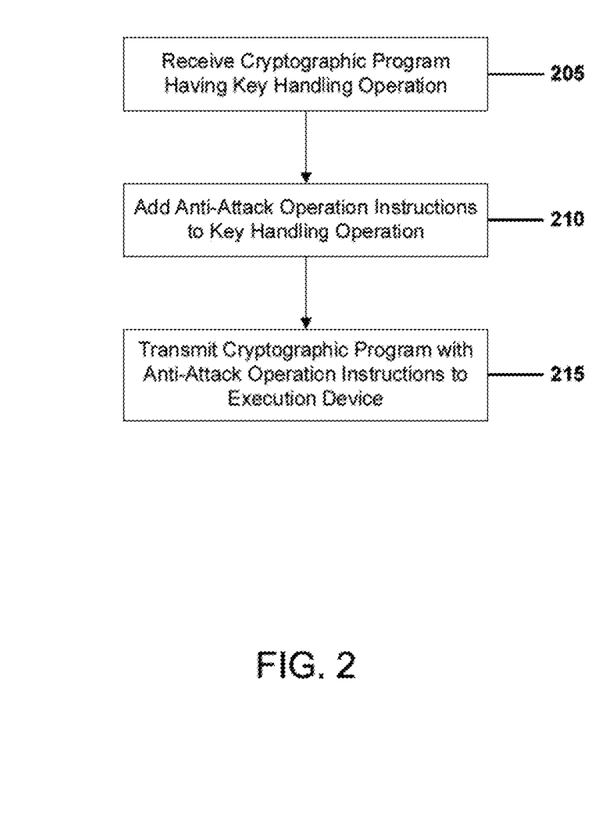
FIG. 2 depicts a flow diagram of an illustrative method for preventing software-based side-channel attacks, arranged in accordance with at least some embodiments described herein.
Figure 5:
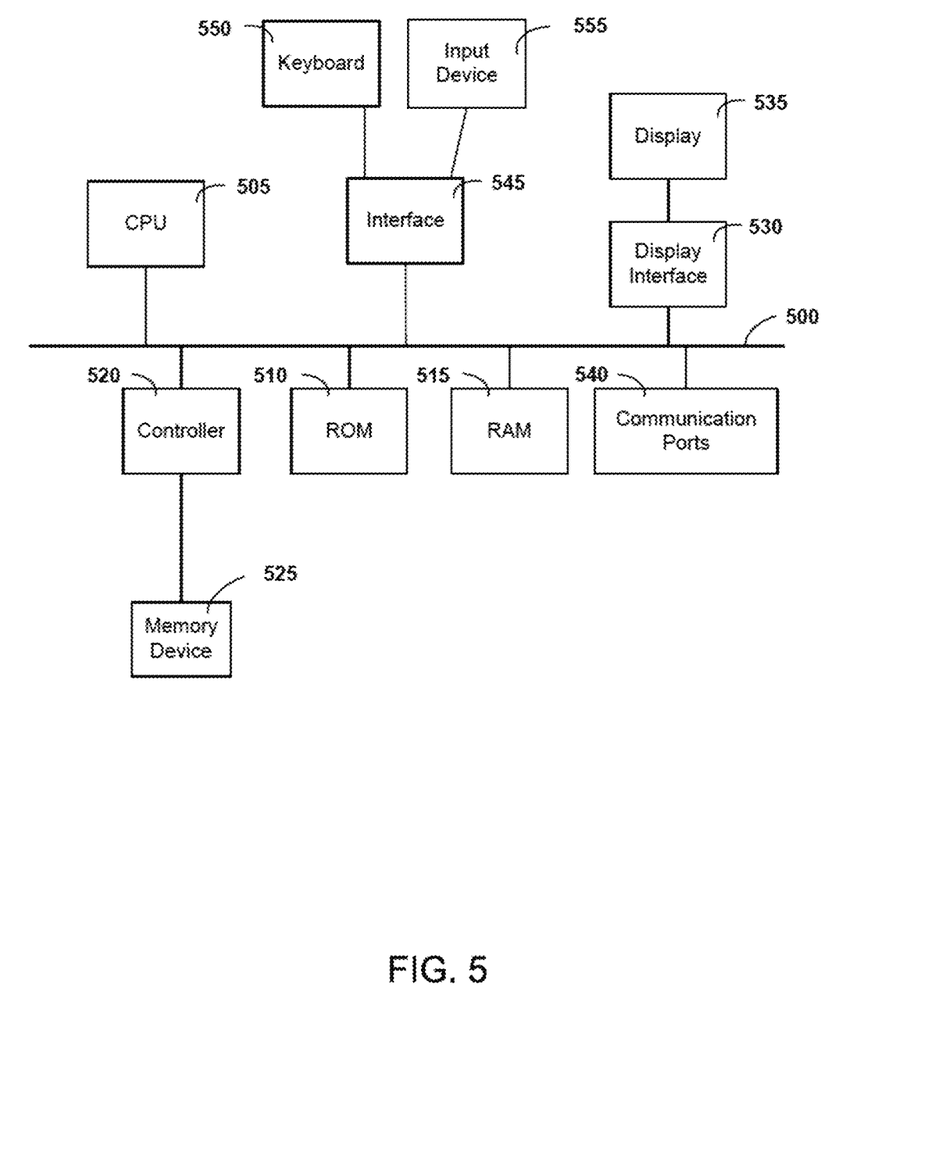
FIG. 5 depicts a block diagram of illustrative internal hardware that may be used to contain or implement program instructions for preventing software-based side-channel attacks, arranged in accordance with at least some embodiments described herein.

FIG. 2 depicts a flow diagram of an illustrative method for preventing software-based side-channel attacks, arranged in accordance with at least some embodiments described herein. Example methods may include one or more operations, functions or actions illustrated by one or more of blocks 205, 210 and/or 215. The operations described in blocks 205 through 215 may also be stored as computer-executable instructions in a computer-readable medium such as the memory element 525 (FIG. 5). Although illustrated as discrete blocks, various blocks may be divided into additional blocks, combined into fewer blocks, or eliminated, depending on the desired implementation.

Beginning at block 205, "RECEIVE CRYPTOGRAPHIC PROGRAM HAVING KEY HANDLING OPERATION", a computing device such as, by way of example, any one of computing devices 105a-N may receive a cryptographic program having one or more programming instructions for performing a key handling operation. In one embodiment, the cryptographic program may be received from a programmer or software developer from a separate computing device. In another embodiment, the cryptographic program may be developed on the computing device 105a-N itself. The key handling operation may include one or more instructions that determine a key, look-up a key, or otherwise perform some operation with respect to a key, where the key is a cryptographic key used for encryption, decryption or the like. The computing device may be associated with a software developer or entity that generates, modifies, or uses the cryptographic program. Block 205 may be followed by block 210.

At block 210, "ADD ANTI-ATTACK OPERATION INSTRUCTIONS TO KEY HANDLING OPERATION", one or more programming instructions for performing an anti-attack operation may be added to the one or more programming instructions for performing the key handling operation. The operator of the computing device and/or the computing device may add the one or more programming instructions that implement the anti-attack operation. The one or more programming instructions that are added to the cryptographic program may not have an effect on any computation required by the cryptographic program. Rather, the instructions may be non-operations (i.e., NOOP instructions) that merely perform a memory access, mathematical computation, branching operation or other operation for which the result is not used by the cryptographic program. Because the results of the particular instructions that are part of the anti-attack operation are not used by the cryptographic program for any purpose, the instructions may be automatically added to the cryptographic program by a computer or manually added by a software developer or operator of the computing device.

The anti-attack operation may be used to mask any key performance events that occur as a result of the performance of the cryptographic program by causing multiple key performance events to occur on an execution device when executed. For example, in a cloud computing system, a side-channel attack performed on a cloud computing device may identify one or more of the following key performance behaviors: cache behavior (e.g., cache misses and/or hits), branch statistics (e.g., taken conditional branches and/or guessed conditional branches), software faults (e.g., divide by zero operations), memory accesses and/or the like on the cloud computing device by monitoring counters recording such events. The anti-attack operation may add additional programming instructions to the cryptographic program in order to mask such counters. For example, the anti-attack operation may add one or more programming instructions that result in the occurrence of one or more key performance events.

In one embodiment, the anti-attack operation may result in a random number of key performance events that is from about 3 times to about 10 times the number of key performance events that would occur as a result of executing only the one or more programming instructions for performing the key handling operation. In one embodiment, the anti-attack operation may result in about 2 times, about 3 times, about 4 times, about 5 times, about 6 times, about 8 times, or about 10 times the number of key performance events that would occur as a result of executing only the one or more programming instructions for performing the key handling operation, or a range between any two of these values.

In one embodiment, the anti-attack operation, when executed, may be configured to cause a random number of key performance events to occur. In one embodiment, the anti-attack operation, when executed, may be configured to cause a pseudorandom number of key performance events to occur.

Block 210 may be followed by block 215.

At block 215, "TRANSMIT CRYPTOGRAPHIC PROGRAM WITH ANTI-ATTACK OPERATION INSTRUCTIONS TO EXECUTION DEVICE", the computing device may transmit the modified cryptographic program including the anti-attack operation to an execution device to be executed. For example, the computing device may transmit the cryptographic program to a cloud computing device. In one embodiment, the modified cryptographic program may be transmitted in executable form to the execution device. In another embodiment, the modified cryptographic program may be transmitted in a source code format. In such an embodiment, the execution device may receive the modified cryptographic program and compile the program prior to execution.

Figure 3:
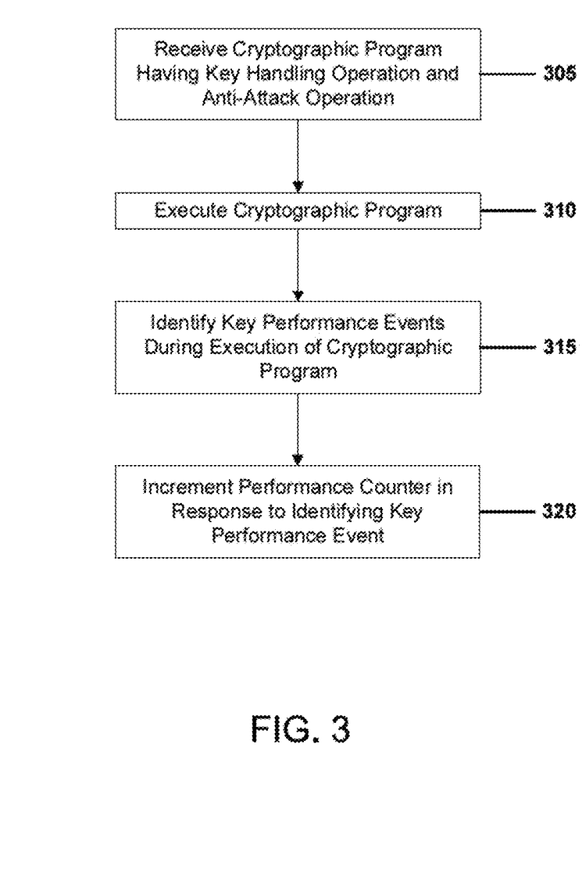
FIG. 3 depicts a flow diagram of an illustrative method for preventing software-based side-channel attacks, arranged in accordance with at least some embodiments described herein.

FIG. 3 depicts a flow diagram of an illustrative method for preventing software-based side-channel attacks, arranged in accordance with at least some embodiments described herein. Example methods may include one or more operations, functions or actions illustrated by one or more of blocks 305, 310, 315 and/or 320. The operations described in blocks 305 through 320 may also be stored as computer-executable instructions in a computer-readable medium such as the memory element 525 (FIG. 5). Although illustrated as discrete blocks, various blocks may be divided into additional blocks, combined into fewer blocks, or eliminated, depending on the desired implementation.

Beginning at block 305, "RECEIVE CRYPTOGRAPHIC PROGRAM HAVING KEY HANDLING OPERATION AND ANTI-ATTACK OPERATION", a cryptographic program having one or more programming instructions for performing a key handling operation may be received by a cloud computing device, such as, by way of example, any one of cloud computing devices 115a-N. The key handling operation may include an anti-attack operation. The anti-attack operation may be used to mask any key performance events that occur as a result of the performance of the cryptographic program by causing multiple key performance events to occur on the cloud computing device when executed. In one embodiment, the cryptographic program may be received from a computing device, such as, by way of example, any one of computing devices 105a-N. In one embodiment, the computing device from which the cryptographic program is received may be operated by a third party, such as a software developer or the like. In one embodiment, the cryptographic program may be received in an executable format. In another embodiment, the cryptographic program may be received in a source code format and compiled by the cloud computing device. Block 305 may be followed by block 310.

At block 310, "EXECUTE CRYPTOGRAPHIC PROGRAM", the cloud computing device may execute the cryptographic program. As a result of executing the cryptographic program, the anti-attack operation may be performed as well. The execution of the cryptographic program may cause one or more key performance events to occur.

Typically, a side-channel attack performed on a cloud computing device may attempt to discern a number of key performance events that occur for one or more key performance behaviors, such as those identified above in reference to FIG. 2. The anti-attack operation may cause additional key performance events to occur in order to mask the number of key performance events that occur as a result of the cryptographic program if the anti-attack operation were not included. The key performance events may be caused by executing instructions that do not affect the results of the cryptographic program (i.e., NOOP instructions), as described above in reference to FIG. 2. For example, the anti-attack operation may add one or more programming instructions that result in the occurrence of one or more key performance events.

In one embodiment, the anti-attack operation may result in a number of key performance events that is from about 3 times to about 10 times the number of key performance events that would occur as a result of executing only the one or more programming instructions for performing the key handling operation. In one embodiment, the anti-attack operation may result in about 2 times, about 3 times, about 4 times, about 5 times, about 6 times, about 8 times, or about 10 times the number of key performance events that would occur as a result of executing only the one or more programming instructions for performing the key handling operation, or a range between any two of these values.

In one embodiment, about 75% to about 91% of the key performance events that occur during the performance of the cryptographic program may result from the performance of the programming instructions pertaining to the anti-attack operation. In one embodiment, the performance of the anti-attack operation may result in about 60%, about 65%, about 67%, about 70%, about 75%, about 80%, about 83%, about 85%, about 86%, about 88%, about 90%, or about 91% of the number of key performance events that occur as a result of executing the cryptographic program, or a range between any two of these values.

In one embodiment, the anti-attack operation, when executed, may be configured to cause a random number of key performance events to occur. In one embodiment, the anti-attack operation, when executed, may be configured to cause a pseudorandom number of key performance events to occur.

Block 310 may be followed by block 315, which may be followed by block 320.

At block 315, "IDENTIFY KEY PERFORMANCE EVENTS DURING EXECUTION OF CRYPTOGRAPHIC PROGRAM", the cloud computing device may identify one or more key performance events during execution of the cryptographic program. At block 320, "INCREMENT PERFORMANCE COUNTER IN RESPONSE TO IDENTIFYING KEY PERFORMANCE EVENT", the identification of the one or more key performance events may result in at least one performance counter being incremented in response. For example, a performance counter may increment in response to the detection of a hardware event with which it is associated. In one embodiment, the at least one performance counter may include one or more of a cache miss counter, a taken branch counter and a fault counter.

Figure 4:
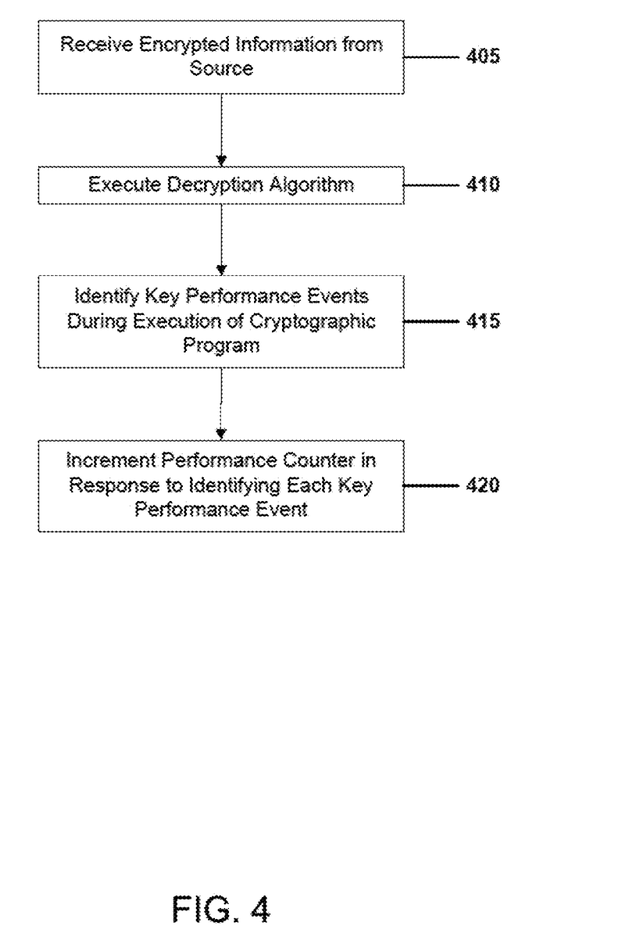
FIG. 4 depicts a flow diagram of an illustrative method for preventing software-based side-channel attacks, arranged in accordance with at least some embodiments described herein.

FIG. 4 depicts a flow diagram of an illustrative method for preventing software-based side-channel attacks, arranged in accordance with at least some embodiments described herein. Example methods may include one or more operations, functions or actions illustrated by one or more of blocks 405, 410, 415 and/or 420. The operations described in blocks 405 through 420 may also be stored as computer-executable instructions in a computer-readable medium such as the memory element 525 (FIG. 5). Although illustrated as discrete blocks, various blocks may be divided into additional blocks, combined into fewer blocks, or eliminated, depending on the desired implementation.

Beginning at block 405, "RECEIVE ENCRYPTED INFORMATION FROM SOURCE", a computing device may receive encrypted information from a source. In one embodiment, the computing device may include multiple performance counters. In one embodiment, the performance counters may include one or more of the following: a cache miss counter, a taken branch counter, and a fault counter.

At block 410, "EXECUTE DECRYPTION ALGORITHM", an algorithm may be executed to decrypt the encrypted information. The algorithm may include an anti-attack operation. Executing the algorithm may cause multiple key performance events to occur. In one embodiment, the key performance events may include cache misses, taken branches, faults, and/or the like. In one embodiment, a random number of key performance events may occur as a result of adding instructions according to the teachings disclosed herein. In one embodiment, a pseudorandom number of key performance events may occur as a result of adding instructions according to the teachings disclosed herein.

In one embodiment, about 75% to about 91% of the key performance events that occur during the performance of the algorithm may result from the performance of the anti-attack operation. In one embodiment, the performance of the anti-attack operation may result in about 60%, about 65%, about 67%, about 70%, about 75%, about 80%, about 83%, about 85%, about 86%, about 88%, about 90%, or about 91% of the number of key performance events that occur as a result of performing the algorithm, or a range between any two of these values.

In one embodiment, the algorithm may be executed as part of a cryptographic program or a key handling operation. In one embodiment, the algorithm may be received from a third party by a computing device, such as, by way of example, any one of cloud computing devices 115a-N. In one embodiment, the anti-attack operation may include one or more instructions that are configured to perform an operation that does not result in a change in the outcome of the algorithm, but rather merely results in an increase of a number of key performance events.

Block 410 may be followed by block 415, which may be followed by block 420.

At block 415, "IDENTIFY KEY PERFORMANCE EVENTS DURING EXECUTION OF CRYPTOGRAPHIC PROGRAM", the computing device may identify one or more key performance events during execution of the cryptographic program. At block 420, "INCREMENT PERFORMANCE COUNTER IN RESPONSE TO IDENTIFYING EACH KEY PERFORMANCE EVENT", at least one of the performance counters may be incremented in response to identifying each key performance event. For example, a performance counter may increment in response to the detection of a hardware event with which it is associated.

FIG. 5 depicts a block diagram of exemplary internal hardware that may be used to contain or implement program instructions, such as the process steps discussed above in reference to FIGS. 2-4, arranged in accordance with at least some embodiments described herein. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. The CPU incorporates performance counters which automatically count performance events. Read only memory (ROM) 510 and random access memory (RAM) 515 constitute exemplary memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard disk drive (HDD), flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

The various embodiments may be realized in the specific examples found below.

EXAMPLES

Example 1: Developing a Software Program Including an Anti-Attack Operation to Mask Cache Misses A software developer will develop a cryptographic program that includes a key handling operation according to standard software development techniques. Upon completion of the coding for the key handling operation, a determination as to the approximate number of memory accesses that the key handling operation would perform when executed will be made by the software developer. A cache hit or a cache miss may be an indication of a certain status in the program. Attacker software may learn about these statistics by gathering this data from performance counters. Additional software to perform five times the number of memory accesses will be added to the software describing the key handling operation. These additional memory accesses will not provide meaningful information to the key handling operation, but will be used to mask the number of memory accesses performed by the key handling operation alone. This, in turn, will prevent the proper determination of the number of memory accesses and/or cache misses resulting from such memory accesses by a side-channel attack.

The memory access can be designed to cause a cache hit or a cache miss. For example, a cache hit can be induced by a memory access to a recently addressed location, and a cache miss can be induced by a memory access to a new address location. By adding a relatively large random number of cache hits or cache misses, the gathered statistics will disable the attacker's capability to gather relevant information. A random number of events may be achieved by having a software loop with a random number of executions.

Example 2: Developing a Software Program Including an Anti-Attack Operation to Mask Branches Taken/Not Taken An attacker program may examine the number of branches taken or branches not taken in order to receive information regarding a cryptographic program. A software developer will develop a cryptographic program that includes a key handling operation according to standard software development techniques. Upon completion of the coding for the key handling operation, a determination as to the approximate number of branch operations that the key handling operation would perform when executed will be made by the software developer. Additional software to perform eight times the number of branch operations will be added to the software describing the key handling operation. These additional branch operations will result in the performance of dummy operations prior to returning to the software that performs the key handling operation.

In general, the additional conditional branch instructions can be relatively large in number. A random number of taken and not taken branches will be added. A taken branch can be induced by performing a branch on a true condition, and an untaken branch can be induced by performing a branch on a false condition. As such, the additional branch operations will be used to mask the number of branch operations performed by the key handling operation alone. This, in turn, will prevent the proper determination of the number of branch operations and/or a number of branches taken or not taken resulting from such branch operations by a side-channel attack.

Example 3: Developing a Software Program Including an Anti-Attack Operation to Mask Software Faults A software developer will develop a cryptographic program that includes a key handling operation according to standard software development techniques. Upon completion of the coding for the key handling operation, a determination as to the approximate number of arithmetic operations that the key handling operation would perform when executed will be made by the software developer. Additional software to perform ten times the number of arithmetic operations will be added to the software describing the key handling operation. These additional arithmetic operations will not provide meaningful information to the key handling operation, but will be used to mask the number of arithmetic operations performed by the key handling operation alone. This, in turn, will prevent the proper determination of the number of arithmetic operations and/or software faults resulting from such arithmetic accesses by a side-channel attack.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method, comprising:
   receiving, by a first device comprising a processor, a cryptographic program from a second device in communication with the first device via a first network device, wherein the cryptographic program comprises a programming instruction for performing a key handling operation comprising a number of memory accesses;
   generating, by the first device, a modified cryptographic program by adding a different programming instruction for performing an anti-attack operation to the programming instruction for performing the key handling operation, wherein the anti-attack operation is a set of memory access operations performed separately from the key handling operation; and
   transmitting, by the first device, the modified cryptographic program with the anti-attack operation to a server device to facilitate generation of a random number of memory accesses in response to execution of the modified cryptographic program by the server device, wherein the random number of memory accesses is different than the number of memory accesses, and wherein the server device is different from the second device and is in communication with the first device via the first network device or a second network device.

2. The method of claim 1, wherein the different programming instruction for performing the anti-attack operation is configured to, in response to being executed, cause a key performance event to occur on the server device.

3. The method of claim 2, wherein the key performance event comprises a cache miss.

4. The method of claim 2, wherein the key performance event comprises a taken branch event.

5. The method of claim 2, wherein the key performance event comprises a fault event.

6. The method of claim 2, wherein key performance events, comprising the key performance event, occur on the server device, and wherein the key performance events comprise a random number of events.

7. The method of claim 2, wherein key performance events, comprising the key performance event, occur on the server device, and wherein the key performance events comprise a first number of events greater than a second number of events that occur as a result of executing the programming instruction for performing the key handling operation.

8. A method, comprising:
   receiving, by a network device comprising a processor, a cryptographic program comprising a programming instruction to perform a key handling operation that includes an anti-attack operation, wherein the receiving comprises receiving the cryptographic program from a device in communication with the network device via another network device, and wherein at least a portion of the cryptographic program is generated by another device that is different from the device; and
   executing, by the network device, the cryptographic program, comprising executing the anti-attack operation and causing key performance events to occur in response to the executing the cryptographic program by the network device, wherein the anti-attack operation is a memory access operation performed separately from the cryptographic program, and wherein the key handling operation comprises a different number of memory accesses from a previous version of the key handling operation.

9. The method of claim 8, wherein the key performance events comprise cache misses.

10. The method of claim 8, wherein the key performance events comprise branch predictor events.

11. The method of claim 8, wherein the key performance events comprise fault events.

12. The method of claim 8, wherein the key performance events comprise a random number of events.

13. The method of claim 8, wherein the key performance events comprise a pseudorandom number of events.

14. The method of claim 8, wherein at least a subset of the key performance events result from executing the anti-attack operation.

15. The method of claim 8, further comprising:
   identifying, by the network device, a key performance event of the key performance events, in response to the executing the cryptographic program; and
   incrementing a performance counter, in response to the identifying the key performance event.

16. The method of claim 15, wherein the performance counter comprises a cache miss counter.

17. The method of claim 15, wherein the performance counter comprises a taken branch counter.

18. The method of claim 15, wherein the performance counter comprises a fault counter.

19. A computer-readable storage device comprising instructions that, in response to execution, cause a system comprising a processor to perform operations, comprising:
   receiving, via a network device, encrypted information from a device;
   executing a process to decrypt the encrypted information, wherein the process comprises an anti-attack operation, and wherein the execution of the process causes key performance events to occur; and
   transmitting a cryptographic program associated with the process to an execution device that is different from the device and is in communication with the system via the network device or another network device, wherein the cryptographic program is transmitted to the execution device to facilitate execution of the cryptographic program by the execution device and generation of a different number of memory access operations than a previous version of the cryptographic program.

20. The computer-readable storage device of claim 19, wherein the key performance events comprise cache misses.

21. The computer-readable storage device of claim 19, wherein the key performance events comprise taken branches.

22. The computer-readable storage device of claim 19, wherein the key performance events comprise faults.

23. The computer-readable storage device of claim 19, wherein the key performance events comprise a random number of events.

24. The computer-readable storage device of claim 19, wherein the key performance events comprise a pseudorandom number of events.

25. The computer-readable storage device of claim 19, wherein at least three key performance events of the key performance events result from the execution of the anti-attack operation.

26. The computer-readable storage device of claim 19, wherein the operations further comprise:
   identification of one or more key performance events of the key performance events in response to execution of the cryptographic program; and
   increment a performance counter in response to the identification of the one or more key performance events.

27. The computer-readable storage device of claim 26, wherein the performance counter comprises a cache miss counter.

28. The computer-readable storage device of claim 26, wherein the performance counter comprises a taken branch counter.

29. The computer-readable storage device of claim 26, wherein the performance counter comprises a fault counter.

30. A system, comprising:

a memory to store instructions; and a processor, coupled to the memory, that executes or facilitates execution of the instructions to at least receive, from a first device, a program that comprises a programming instruction associated with a key handling operation, add a different programming instruction associated with an anti-attack operation to the programming instruction to generate a modified program, and transmit the modified program with the anti-attack operation to a second device different from the first device and is in communication with the system via a first network device, wherein the anti-attack operation is a memory operation performed separately from the key handling operation, and wherein the modified program is transmitted to the second device to facilitate execution of the modified program by the second device and generation of a different number of memory access operations than the program.

31. The system of claim 30, wherein the execution of the programming instruction causes key performance events to occur on the second device.

32. The system of claim 30, wherein the execution of the programming instruction causes cache misses to occur on the second device.

33. The system of claim 30, wherein the program is received via the first network device or a second network device to facilitate the generation of the modified program.

* * * * *